March 19, 1946.   D. FIRTH ET AL   2,396,647
CLUTCH
Filed April 22, 1942   4 Sheets-Sheet 2

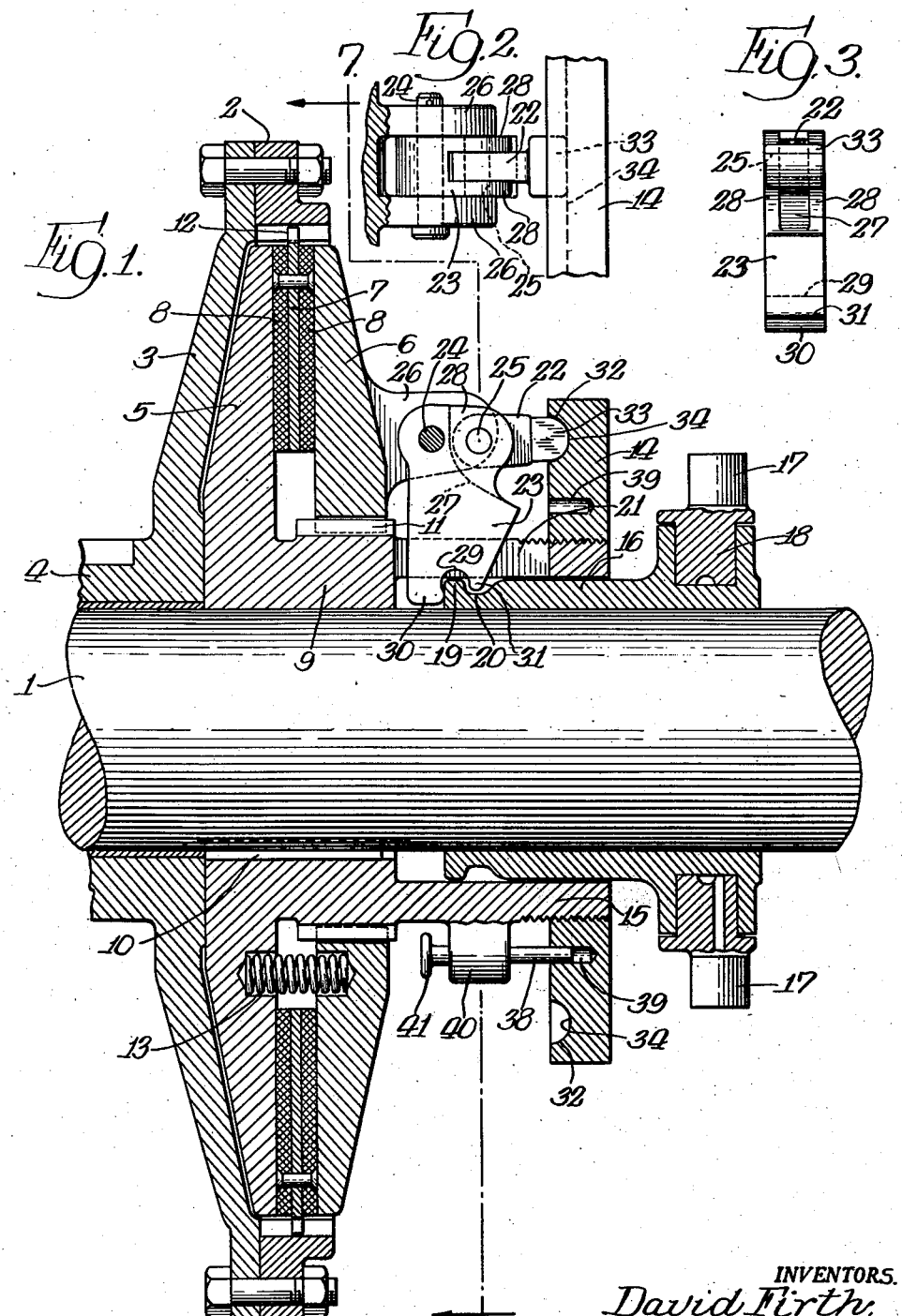

INVENTORS.
David Firth,
Alexander T. Bodle.
By Osgood H Dowell
Atty.

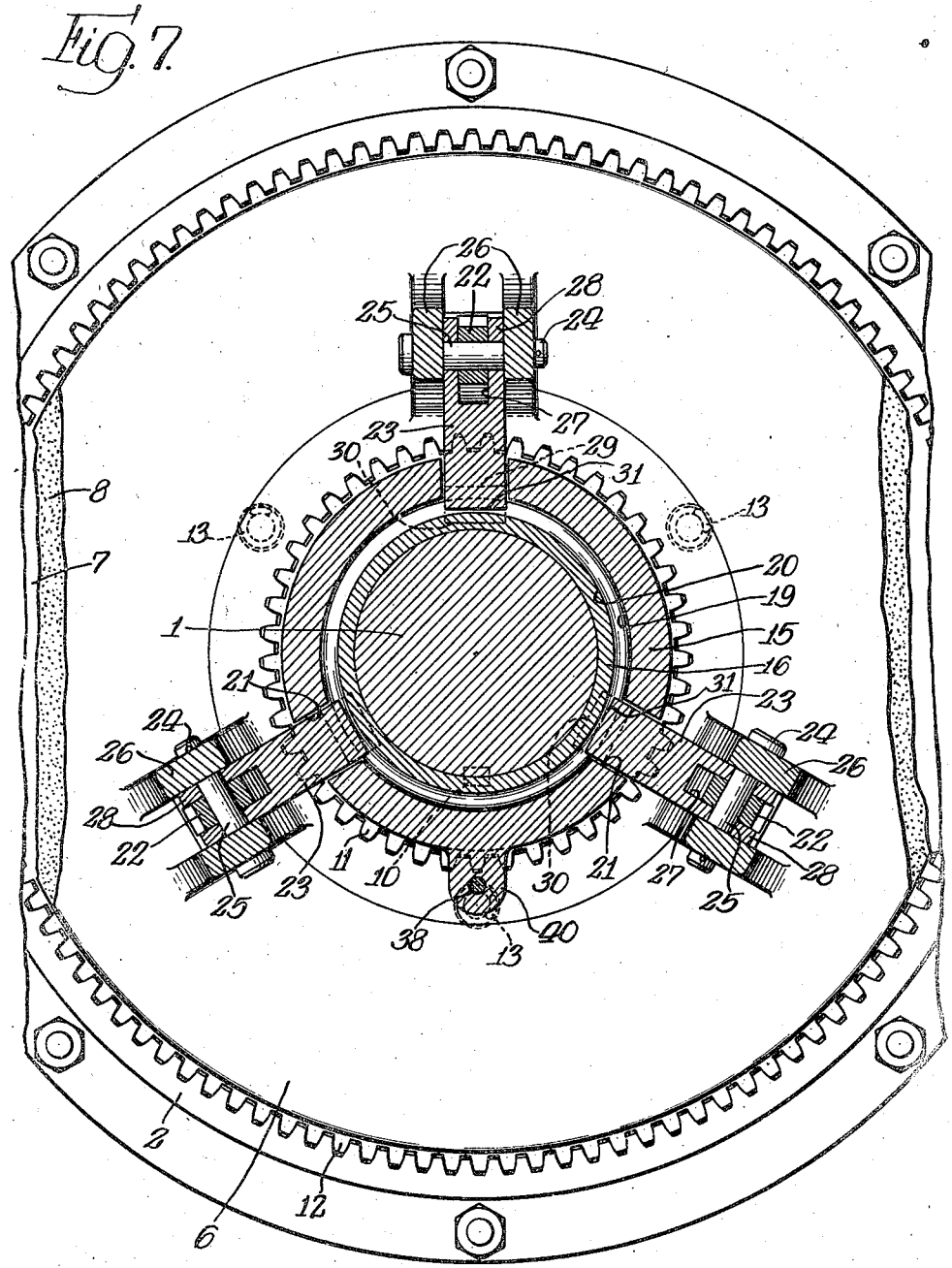

March 19, 1946. D. FIRTH ET AL 2,396,647
CLUTCH
Filed April 22, 1942 4 Sheets-Sheet 4
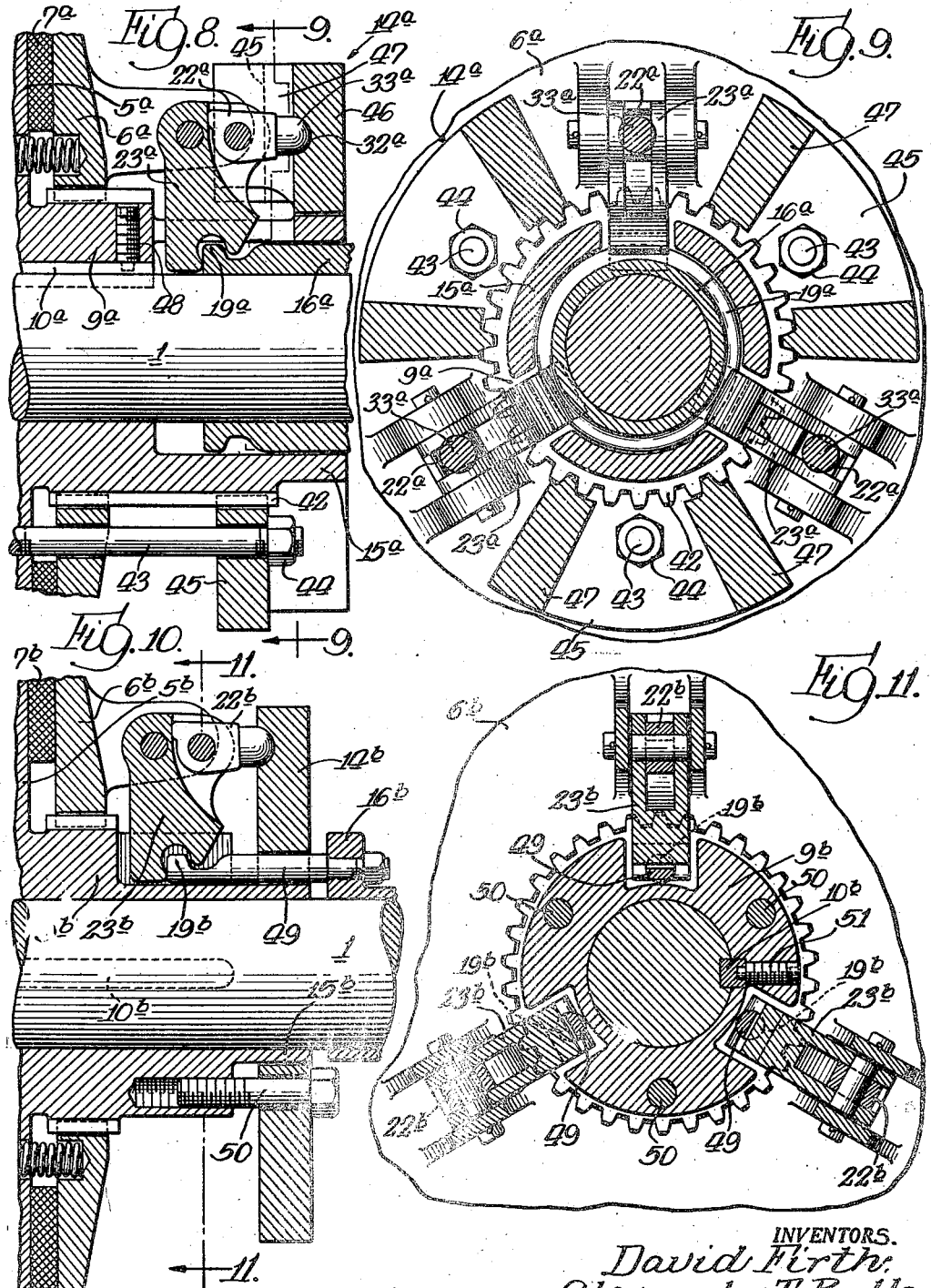
INVENTORS.
David Firth,
Alexander T. Bodle,
By Osgood H. Dowell
Atty.

Patented Mar. 19, 1946

2,396,647

UNITED STATES PATENT OFFICE 2,396,647

CLUTCH

David Firth, South Bend, and Alexander T. Bodle, Mishawaka, Ind., assignors to Dodge Manufacturing Corporation, Mishawaka, Ind., a corporation of Indiana Application April 22, 1942, Serial No. 439,980

10 Claims  (Cl. 192—68)

This invention relates to friction clutches for use in machinery drives and power transmissions.

The general object of the invention is to provide an improved friction clutch of the type comprising confronting members carried by and in driving connection with a shaft and cooperable to grip an interposed friction disc carried by the rotatable machine element which is to be clutched to the shaft. More particularly, the invention aims to improve clutches of said type with respect to the general construction and organization thereof and with respect to the mechanism by which the clutch members are forced into coaction. Further objects ancillary or subsidiary to those stated will be apparent from the following description with reference to the accompanying drawings, in which:

Fig. 1 is a section taken longitudinally of and through the axis of a clutch of one practicable construction embodying the invention, showing the clutch in applied or closed condition.

Fig. 2 is a detail plan view of one of the clutch toggles and the parts between which it acts.

Fig. 3 is a rear elevation of such toggle.

Fig. 7 is a section taken on the line 7—7 of Fig. 1, looking in the direction of the arrows and showing in rear elevation parts beyond the plane on which the section is taken.

Fig. 8 is a partial sectional view of a modified clutch embodying the generic invention but not all specific features thereof.

Fig. 9 is a cross sectional view taken on the line 9—9 of Fig. 8, looking in the direction of the arrows.

Fig. 10 is a sectional view of another modified clutch embodying the generic invention but not all specific features thereof.

Fig. 11 is a cross sectional view taken on the line 11—11 of Fig. 10, looking in the direction of the arrows.

Figure 4:
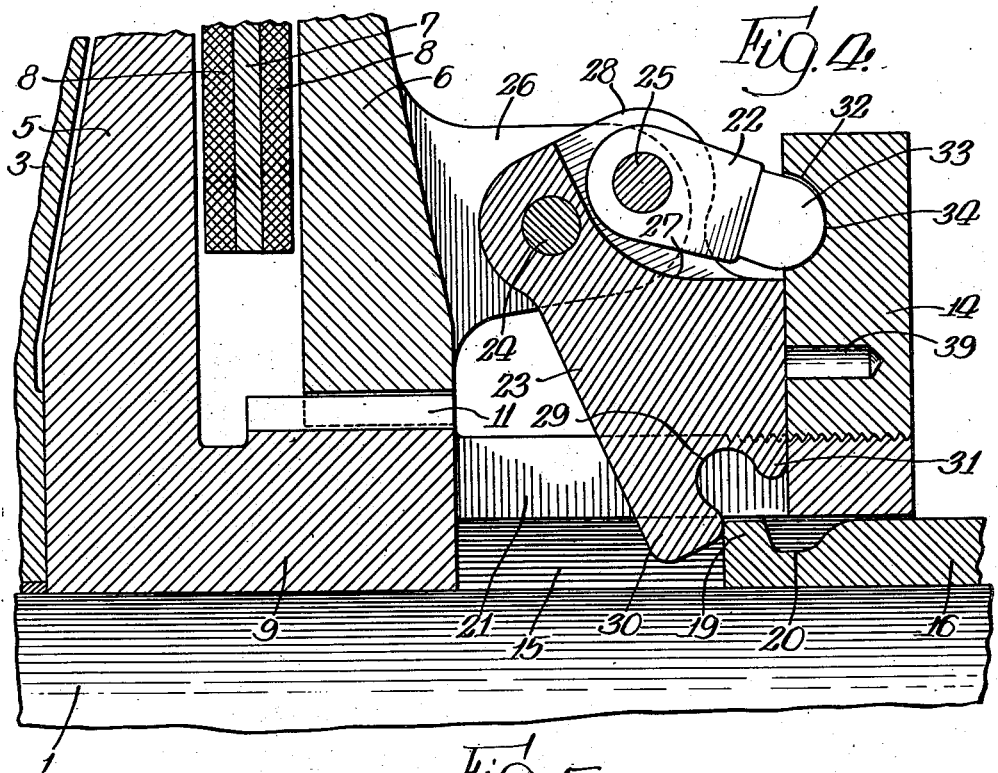
Fig. 4 is an enlarged view of a portion of Fig. 1, showing the clutch in released and open condition.

Each of the several clutches shown in the drawings is represented as installed on a shaft 1 for use in clutching thereto an independently rotatable machine element. The shaft 1 may be considered to represent either a driving or a driven shaft. A rotatable element to be clutched thereto is represented in Fig. 1 by a disc-carrying ring 2 which may be either a part of or attached to a pulley, flywheel or other member rotatable independently of and coaxially with the shaft. In Fig. 1, said ring 2 is shown bolted to a bell-shaped extension 3 from a sleeve 4 loose on the shaft, on which sleeve may be fixed the hub of a pulley or other member.

Referring first to Figs. 1 to 7 inclusive, the illustrative clutch therein shown comprises a pair of confronting members 5 and 6 cooperable to clamp or squeeze an interposed friction disc 7. Said disc may be of fibrous or other suitable material having a high coefficient of friction. It is shown as an annular steel plate faced on opposite sides with attached liners 8 of such material.

The clutch member 5, fixed to or mounted on the shaft in driving connection therewith, carries on its hub the member 6, the latter being in driving connection with but movable axially relative to said carrying member 5. As shown, the hub 9 of said member 5 is keyed to the shaft by a driving key 10, and said member 6 is mounted directly on a portion of said hub extending beyond the clutch face of said member 5. Said extended portion of said hub is shown formed with peripheral gear-like teeth 11, interfitted with and slidably engaged by correspondingly formed internal teeth of the clutch member 6, whereby said member 6 is held firmly on said hub with a strong and efficient driving connection but with freedom to move axially toward and away from its clutch member 5. Assembly of the two clutch members 5 and 6 is easily accomplished by simply slipping the member 6 on the projecting hub of the member 5.

The friction disc 7 is held by and in driving connection with the rotatable member or element with carries it. It is shown formed with peripheral teeth 12 interfitted with correspondingly formed internal teeth of the ring 2, whereby said disc is properly held with capability of axial movement as is desirable in the operations of applying and releasing the clutch.

Springs 13 arranged and reacting between the clutch members 5 and 6 exert pressure against the axially movable member 6 in a direction to force it away from the member 5, whereby to promote or assure separation of the coactive friction faces of the clutch when released. These springs are arranged about the clutch shaft in alternation with the toggles presently to be described.

Coaction of the clutch members 5 and 6 to clamp or squeeze the interposed friction disc is effected by actuation of toggles arranged between and so as to exert opposing thrusts on the movable clutch member 6 and a thrust collar 14 behind it, which thrust collar is carried by the hub 9 and held from displacement rearwardly by connection with said hub; said collar thus functioning to sustain the back thrust of the toggles and to transfer such thrust to said hub of the clutch member 1. As shown, said thrust collar 14 is supported on a tubular support or projection 15 extending from said hub rearwardly of or beyond the back of the movable clutch member and enclosing the shaft; the collar 14 being mounted on said projection or support and held thereto by screw threaded engagement therewith. Thus this thrust collar 14 functions also as an adjusting nut. By rotating or turning said nut 14, its axial relation to the clutch hub can be adjusted as required for adjusting the axial relationship of the clutch members 5 and 6 in applied or closed condition of the clutch, and for taking up such adjustment from time to time to compensate for wear of the friction faces of the clutch.

The toggle mechanism of the clutch comprises preferably three toggles arranged at equal angular distances around the clutch shaft, as shown in Fig. 7. Two toggles at diametrically opposite sides of the shaft could be employed, but three arranged as shown are preferred for more equal distribution of the pressure applied by the several toggles. The toggles are actuated by means carried by an axially movable clutch shifter 16 slidable on the shaft and operable by any appropriate means as, for example, a clutch throw lever (not shown) having a yoked arm engaging pintles 17 on a collar 18 swiveled to said clutch shifter.

As shown, the clutch shifter 16 comprises a sleeve slidable on the shaft and within the tubular support or nut holder 15 which provides a guide therefor independently of or in addition to that provided by the shaft. Said sleeve is formed or provided with toggle-actuating means represented by the shouldered fore end portion 19 of said sleeve, the annular shoulder of which is provided by forming an annular groove 20 in said sleeve near its fore end. It will be apparent that the annular means 19 is the functional equivalent of a plurality of angularly spaced devices corresponding in form and position to the respective parts of said means 19 which are in operative association with the respective toggles. In other words, the means 19 combines a plurality of toggle-actuating parts or devices in a simple annular form. The tubular support 15 is formed with longitudinal slots 21 through which elements of the toggles extend for operative engagement with said toggle-actuating means 19. The said means 19 may be considered as a camming means coactive with said toggle elements for actuating the toggles to apply the clutch and for reversely operating them to release the clutch.

Each toggle comprises a lever 22 having a fulcrum bearing against the thrust collar or nut 14, and an element 23 pivoted by the fulcrum pin 24 to the movable clutch member 6 and by the knuckle pin 25 to said lever 22. In the specific construction shown, the element 23 is pivoted by the pin 24 to and between a pair of supporting lugs 26 on the back of the clutch member 6, and the lever 22, entering a slot 27 in said element 23, is pivoted to and between the ears 28 thereof by the pin 25. Said element 23, shown as an irregularly shaped block-like piece, provides a short toggle arm combined with and at the outer end of a relatively long operating arm or lever for engagement by the actuating means 19. The short toggle arm referred to is represented by the line connecting the centers of the pivot pins 24 and 25. In mechanical effect, said element 23 is a kind of angle lever fulcrummed on the pin 24 and having the respective arms referred to, i. e. a short toggle arm connected by the knuckle pin 25 to the other toggle arm or lever 22, and a relatively long inwardly extending operating arm. By forming said element as shown, instead of in ordinary angle lever form, there are gained not only increased strength of the levering element but also mechanical advantage in power application, inasmuch as force applied by the actuating means 19 to the operating end of said element or lever is transferred through its body directly to the knuckle pin 25, with the effect of giving greater leverage for power application than that represented by the distance from the center of the fulcrum pin 24 to the actuating means 19. At its inner or operating end, said element or lever 23 is shown formed with a cut out portion providing a recess 29 and arm projections 31 and 30 for engagement by the actuating means 19 on forward and backward movements thereof.

It will be understood that the foregoing description of an individual toggle is applicable to the several toggles which are similarly constructed and arranged for simultaneous actuation by the clutch shifter by coaction of the actuating means 19 thereon with the lever arm projections 30 and 31 of the elements or levers 23 of the respective toggles.

The operation is as follows: In the released condition of the clutch, the toggles being relaxed as shown in Fig. 4, the toggle elements or levers 23 are in position for engagement of their fore arm projections 30 by the shouldered fore end 19 of the shifter sleeve 16 on forward movement thereof, while the rear arm projections 31 are retracted or positioned outwardly away from said sleeve. To apply the clutch, the shifter sleeve 16 is forced forward or to the left from the position shown in Fig. 4. In this movement, the fore end of said sleeve or actuating means 19 thereof, pushing against the rounded tips of the arm projections 30, forcibly swings said elements or levers 23 in a clockwise direction or forwardly and inwardly from the position shown in Fig. 4 to the position shown in Fig. 1, thereby forcibly actuating or stressing the toggles to force the clutch member 6 into disc-clamping coaction with the clutch member 1. The arrangement and adjustment of the clutch mechanism is preferably such as to allow complete straightening of the toggles in the clutch-applying operation, and the locking of the clutch in applied or closed condition by forcing the toggle knuckles 25 slightly inwardly past dead center positions, i. e. with the centers of the knuckle pins 25 slightly inwardly past the lines of centers of the fulcrum pins 24 and fulcrums of the levers 22. When the clutch is applied, the shaft 1, clutch members 5 and 6, interposed friction disc 7 and its carrier ring 2, rotate as a rigid unit, as is apparent. In the clutch applying operation, as the shifter sleeve 16 moves forward and the toggle elements or levers 23 swing to the position shown in Fig. 1, the shoulder at 19 enters the recesses 29 while the arm projections 31 swing inwardly behind said shoulder or into the groove 20 in the specific construction illustrated. To release the clutch, the shifter sleeve 16 is forced backward or to the right from the position shown in Fig. 1. In this movement the shoulder at 19 pushing and camming against the rounded arm projections 31 forcibly swing the toggle elements or levers 23 in a counter-clockwise direction or rearwardly and outwarly from the position shown in Fig. 1 toward that shown in Fig. 4. It will be observed that the release operation is positive, being only assisted but not depending upon the springs 13. Nor could the springs initiate release while the toggles are either straight or locked as aforesaid by having the centers of the toggle knuckles slightly inwardly past dead center positions. On the other hand, the springs 13 promote or assure prompt backward movement of the clutch member 6 to release the clutch disc 7 as soon as the toggles are flexed outwardly to relax them. In the releasing operation, the shoulder at 19 pushes outwardly and under the arm projections 31, after which there may be continued backward movement of the sleeve 16 while the toggle elements or levers 23 may swing to the positions shown in Fig. 4 by the momentum given them in the releasing operation and by the force of the springs 13.

To permit adjustment for wear compensation by rotation of the nut 14, the toggle levers 22 of the several toggles have their rear ends bearing pivotly against but in sliding engagement with an annular seat therefor on said nut. In the illustrative construction, such seat is provided by an annular groove 32 of semi-circular or particircular cross section, and the toggle levers 22 have rear rounded fulcrum portions bearing against said nut in said groove and slidably fitted therein to permit rotation of the nut.

Figure 5:
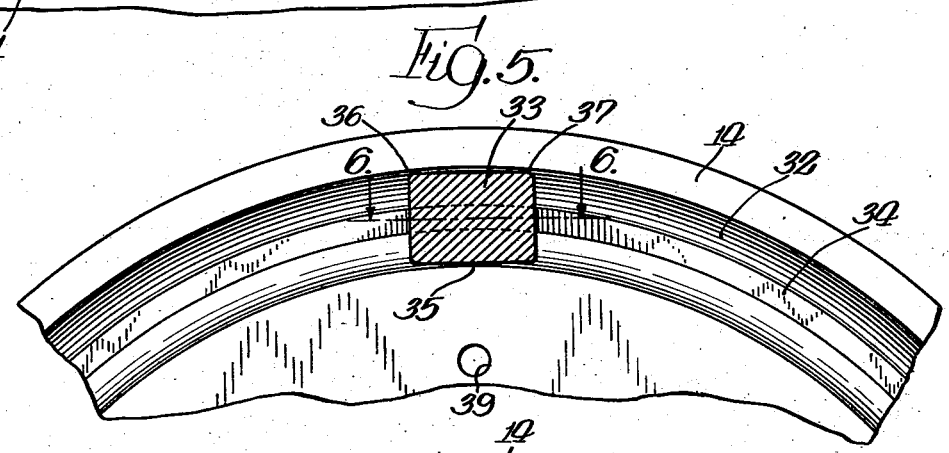
Fig. 5 is a detail view showing in front elevation a fragment of the adjusting nut which sustains backward thrust of the clutch goggles, and showing in section an element of one of said toggles.
Figure 6:
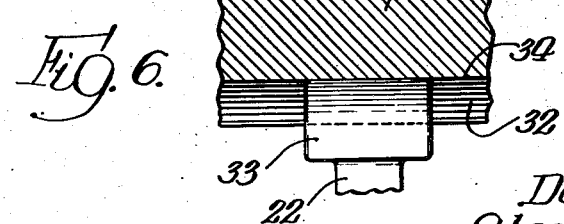
Fig. 6 is a horizontal section taken on the line 6—6 of Fig. 5.

As a specific feature of the invention, the construction shown in Figs. 4 to 6 is provided. According to this construction, the toggle lever 22 of each toggle has a rear fulcrum portion in the form of a pintle 33 with a straight cylindrical bearing surface perpendicular to the plane of operation of the toggle but of sufficiently less radius than the radius of the cross section of the groove 32 to fit slidably therein. At the middle or center of the groove 32 is a narrow flat surface 34 against which such pintle bears, the cross section of said flat surface being a short chord of a circle coincident with the cross section of the wall of the groove. By virtue of this construction the pintle bears for its full length against said flat surface 34, as shown in Fig. 6, and wear between the contacting bearing surfaces of the pintle and nut is not of serious moment. There may be sliding contact or near contact between the pintle and wall of the groove at or near the points indicated at 35, 36 and 37 in Fig. 5.

The fulcrum end portions of the toggle levers 22 could be spherical and fit in a semicircular groove in the thrust nut, but in that case there would be only line contact between the lever fulcrums and the nut and under excessive pressure there might be objectionable wear of the contacting bearing surfaces. The fulcrum portions of said toggle levers 22 could also be pintles of arcuate form to fit a semicircular groove, but such a construction would be more expensive and involve difficult machining. The construction described with reference to Figs. 5 to 7 is considered more practicable than and preferable to the others mentioned.

The nut 14 may be held in its adjusted position or against accidental turning by a spring-actuated detent pin 38 engaging one of a circular series of holes 39 in said nut, said pin being slidably mounted in a holder 40 therefor attached to the hub projection 15 and being provided with a head or knob 41 by which the pin can be retracted from the hole 39 in which it engages. As the thrust collar or nut is turned the angular distances from one pin hole 39 to the next, the pin 38 unless held retracted will snap into such next hole.

It will be apparent that the illustrative construction above described provides a clutch of a highly practicable and efficient character, and one which is well adapted for use in high speed machinery and power transmissions. The construction is sturdy and compact, comparatively simple, composed of a relatively few parts, easily assembled, and susceptible of manufacture less expensively than certain prior clutches of similar type. In operation, the clutch members are forced into coaction by actuation of toggle mechanism of advantageous character, and the release operation is positive, permitting the employment of toggles which are forced to and preferably slightly past dead center positions for locking the clutch in the applied or closed condition and relieving the springs 13 of the duty of flexing the toggles outwardly for the releasing operation. With other advantageous features and characteristics, the clutch is conveniently adjustable for taking up wear of the coacting friction surfaces. The character of the clutch is such that it may be used for a long period of service without the necessity of such adjustment. When adjustment becomes necessary, it can be easily accomplished by simply turning the adjusting nut 14 the distance from one hole 39 to the next. The adjustment affects the axial relation of the nut to the clutch member 1, thereby affecting the actual relation of the clutch members 5 and 6 in the closed condition of the clutch, but without affecting the relative shift of the operating elements. There being no effect upon the throw, the clutch is well adapted for installations embodying a mechanical operator for throwing in and out the clutch. In short, the operating characteristics and capabilities desirable for a highly practicable and efficient clutch of the type referred to are obtained in a construction of generally improved character.

The several capabilities and advantages above referred to, except adjustment merely by turning of an adjusting nut, are also had or obtained in the clutches of modified construction shown in Figs. 8 to 11 which, as hereinbefore indicated, embody the generic invention herein set forth but not all of the specifically novel and inventive features of the construction shown in Figs. 1 to 7.

In Figs. 8 and 9, the principal elements corresponding to those of the clutch first described are the members 5a and 6a, interposed friction disc 7a, clutch hub 9a, tubular hub projection 15a, thrust collar 14a, toggles comprising elements 22a and 23a, and the clutch shifter 16a having the toggle-actuating means 19a. The construction shown in Figs. 8 and 9 is substantially identical to that of the first described clutch except that in Figs. 8 and 9 the thrust collar 14a, instead of being screwed as an adjusting nut on the hub projection 15a, is fitted slidably thereon, prevented from turning relative thereto by a spline 42, and held in thrust-sustaining position or from displacement rearwardly by connection to the hub by means of bolts 43, by adjustment of the heads 44 of which the axial relationship of the thrust collar to the clutch member 5ª can be adjusted. Said thrust collar 14ª is shown as an annular member of undulating form having alternating forwardly and rearwardly offset portions 45 and 46 joined by the connecting portions 47. The bolts 43 are connected with the forwardly offset portions 45 of said thrust collar, and the rear toggle elements or levers 22ª bear against the rearwardly offset portions 46. As shown, the toggle levers 22ª have their pintles 33ª bearing in seats 32ª of the said rear portions 46 of said thrust collar. Said pintles 33ª may be ball-shaped or have hemispherical portions fitted in hemispherical sockets in the thrust collar, or the pintles 33ª may be formed like the pintles 33 in Figs. 5 and 6 and said seats 32ª may be provided as straight grooves of semi-circular crosss section. In Fig. 8 a set screw is shown at 48 engaging a hole in the shaft key 10ª for securing the clutch hub in fixed relation to the shaft key.

Substantially similar in construction and mode of operation to the clutch first described is that shown in Figs. 10 and 11 except that its toggle actuating means 19ᵇ, instead of being formed on the fore end of a clutch shifter sleeve slidable within a hub projection, are formed as a plurality of such means on the fore ends of rods 49 extending longitudinally from and rigidly affixed to a clutch shifter 16ᵇ slidable on the shaft, and the back thrust of the toggles is taken by a thrust collar 14ᵇ fitted slidably on a hub extension 15ᵇ and held in place or from displacement rearwardly by bolt-screws 50 manipulatable for adjusting the axial relation of said thrust collar to the clutch hub 9ᵇ, said rods 49 being slidably fitted in holes therefor in said thrust collar. In Figs. 10 and 11, the disc-clamping clutch members and interposed disc are designated by the reference characters 5ᵇ, 6ᵇ, 7ᵇ, and the toggle elements by the reference characters 22ᵇ and 23ᵇ. In Fig. 8, the set screw 51 engages a hole in the shaft key 10ᵇ to secure the clutch hub in fixed relation thereto.

We claim as our invention:

1. A clutch comprising disc-clamping members, one carrying and in driving connection with the other which is movable axially relative to said one, a thrust collar carried by said carrying member behind said movable member and held from displacement rearwardly by connection with said carrying member, toggles comprising knuckle-jointed elements arranged between and for thrust of said elements oppositely against said thrust collar and movable member, the toggle elements being pivotally jointed at opposite sides of the toggle knuckles to said movable member and thrust collar, said toggles being operable inwardly to stress them, the elements of said toggles fulcrumed on said movable member consisting of levers providing short toggle arms and relatively long inwardly extending operating arms, and axially movable toggle actuating means having shoulder means on the fore end thereof, said long arms having projections engageable by said fore end on forward movement of said means and projections which swing behind said shoulder means during such movement, said toggles being operable to release the clutch by coaction of said shoulder means with said last mentioned projections on backward movement of said actuating means.

2. A clutch comprising disc-clamping members, one carried on the hub of the other in driving connection therewith and movable axially toward and from said other member, said hub having a tubular projection extending rearwardly of said movable member, a thrust collar supported on said projection and held from displacement rearwardly by connection with said hub, toggles comprising knuckle-jointed elements arranged between and for thrust of said elements oppositely against said collar and movable member, corresponding elements of said toggles providing short toggle arms and relatively long inwardly extending operating arms, said tubular projection having longitudinal slots into which said operating arms extend, and an axially movable clutch shifter having a sleeve portion engageable with said operating arms for actuating said toggles.

3. A clutch comprising disc-clamping members, one carried on the hub of the other in driving connection therewith and movable axially relative thereto, a thrust collar behind said movable member carried by said hub and held from displacement rearwardly by connection with said hub, toggles comprising knuckle-jointed elements arranged between and for thrust of said elements oppositely against said collar and movable member, the toggle elements being pivotally jointed at opposite sides of the toggle knuckles to said movable member and thrust collar, corresponding elements of said toggles being levers fulcrumed on said movable member providing short toggle arms and relatively long inwardly extending operating arms, the other elements of said toggles being levers pivotally connected to said short arms and fulcrummed on said thrust collar, an axially movable clutch shifter, and rods rigidly affixed to and extending forwardly therefrom having means engageable with said long arms for actuating said toggles.

4. A clutch comprising disc-clamping members, one carried by the hub of the other in driving connection therewith and movable axially relative thereto, said hub having a tubular projection extending beyond said movable member, an adjusting nut mounted behind said movable member on said projection in screw-threaded engagement therewith, toggles comprising knuckle-jointed elements arranged between and for thrust of said elements oppositely against said nut and movable member, the toggle elements bearing against said nut being in slidable engagement therewith to permit rotation of the nut for adjustment, and axially movable means for actuating said toggles, said nut having an annular groove with a narrow flat bottom or central surface which in cross section is a short cord of a circle coincident with the cross section of said groove, and the toggle elements engaging said nut having fulcrum portions comprising pintles with straight cylindrical surfaces perpendicular to the planes of operation of the toggles and of less radius than the radius of the cross section of said groove, said pintles bearing against said narrow flat surface and being slidably fitted in said groove.

5. In a friction disc clutch having an axially shiftable clutch plate and an opposing member with which it coacts to clamp or squeeze interposed friction disc means, the combination comprising an axially adjustable thrust-sustaining ring behind said plate, toggles comprising knuckle-jointed members arranged between and for thrust of said members oppositely against said ring and plate for forcing the latter into coaction with said opposing member, the toggle members being pivotally jointed at opposite sides of the toggle knuckles to said ring and plate, corresponding members of said toggles having inwardly extending arms, a hub carrying said plate and opposing member in driving connection therewith and having an extension carrying said ring, and axially shiftable means extending through said ring and operatively engageable with said arms both on protractive and retractive movement of said means for forcing the toggles by positive action to and from self-locked clutch-applying position.

6. In a friction disc clutch having an axially shiftable clutch plate and an opposing member with which it coacts to clamp or squeeze interposed friction disc means, the combination comprising an axially adjustable thrust-sustaining ring behind said plate, toggles comprising knuckle-jointed members arranged between and for thrust of said members oppositely against said ring and plate for forcing the latter into coaction with said opposing member, the toggle members being pivotally jointed at opposite sides of the toggle knuckles to said ring and plate, and corresponding members of said toggles having inwardly extending arms, a hub carrying said plate and opposing member in driving connection therewith and having an extension carrying said ring, and axially shiftable means extending through said ring and operatively engageable with said arms both on protractive and retractive movement of said means for forcing the toggles by positive action to and from self-locked clutch-applying position, there being operative connection between said arms and shiftable means permitting withdrawal of the latter from engagement with said arms by continued retractive movement of said shiftable means after forcing the toggles to position for clutch-release.

7. In a friction disc clutch having an axially shiftable clutch plate and an opposing member with which it coacts to clamp or squeeze interposed friction disc means, the combination comprising an axially adjustable thrust-sustaining ring behind said plate, toggles comprising knuckle-jointed members arranged between and for thrust of said members oppositely against said ring and plate for forcing the latter into coaction with said opposing member, the toggle members being pivotally jointed at opposite sides of the toggle knuckles to said ring and plate, corresponding members of said toggles having inwardly extending arms, and axially shiftable means extending through said ring and engageable with said arms for forcing the toggles by positive action to and from self-locked clutch-applying position, said arms having recesses and said shiftable means having shoulder portions which enter said recesses and behind which portions of said arms swing as said means is forced to position to apply the clutch, whereby reverse operation of said shiftable means forces the toggles to clutch-releasing position by coaction of said shoulder portions with said arm portions and said arms are swung to position to free said means from engagement therewith.

8. In a friction disc clutch having an axially shiftable clutch plate and an opposing member with which it coacts to clamp or squeeze interposed friction disc means, the combination comprising an axially adjustable thrust-sustaining ring behind said plate, toggles comprising knuckle-jointed members arranged between and for thrust of said members oppositely against said ring and plate for forcing the latter into coaction with said opposing member, the toggle members being pivotally jointed at opposite sides of the toggle knuckles to said ring and plate, said toggles being operable inwardly for stressing them, the members of said toggles which are fulcrummed on said plate having inwardly extending arms, and axially shiftable means cooperable with said arms for operating said toggles.

9. In a friction disc clutch having an axially shiftable clutch plate and an opposing member with which it coacts to clamp or squeeze interposed friction disc means, the combination comprising an axially adjustable thrust-sustaining ring behind said plate, toggles comprising knuckle-jointed members arranged between and for thrust of said members oppositely against said ring and plate for forcing the latter into coaction with said opposing member, the toggle members being pivotally jointed at opposite sides of the toggle knuckles to said ring and plate, said toggles being operable inwardly for stressing them, the members of said toggles which are fulcrummed on said plate having inwardly extending arms, and axially shiftable means cooperable with said arms for operating said toggles, said shiftable means having shoulder portions on the fore end thereof and said arms having projections pushed by said means on forward movement thereof and other projections which swing behind said shoulder portions during such movement, substantially as and for the purpose described.

10. In a friction disc clutch having an axially shiftable clutch plate and an opposing member with which it coacts to clamp or squeeze interposed friction disc means, the combination comprising an axially adjustable thrust-sustaining ring behind said plate, toggles comprising knuckle-jointed members arranged between and so for thrust of said members oppositely against said ring and plate for forcing the latter into coaction with said opposing member, the toggle members being pivotally jointed at opposite sides of the toggle knuckles to said ring and plate, a hub carrying said plate and member in driving connection therewith and having an extension carrying said ring, said extension having longitudinal slots, corresponding members of said toggles having inwardly extending arms entering said slots, and axially shiftable means slidable in said extension and cooperable with said arms for operating said toggles.

DAVID FIRTH.
ALEXANDER T. BODLE.